(12) United States Patent
Khoshnevisan et al.

(10) Patent No.: US 11,470,592 B2
(45) Date of Patent: Oct. 11, 2022

(54) DYNAMIC RECEIVER TIMING FOR DOWNLINK TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/571,154

(22) Filed: Sep. 15, 2019

(65) Prior Publication Data

US 2020/0092860 A1 Mar. 19, 2020

Related U.S. Application Data

(60) Provisional application No. 62/732,492, filed on Sep. 17, 2018.

(51) Int. Cl.
*H04W 4/00* (2018.01)
*H04W 72/04* (2009.01)
*H04W 76/27* (2018.01)
*H04L 5/00* (2006.01)
*H04W 72/10* (2009.01)

(52) U.S. Cl.
CPC .......... *H04W 72/042* (2013.01); *H04L 5/006* (2013.01); *H04L 5/0048* (2013.01); *H04W 76/27* (2018.02); *H04W 72/10* (2013.01)

(58) Field of Classification Search
CPC ... H04W 72/042; H04W 76/27; H04W 72/10; H04L 5/006; H04L 5/0048; H04L 27/2665; H04L 27/2675
USPC ........................................................ 370/329
See application file for complete search history.

(56) References Cited

U.S. PATENT DOCUMENTS

| | | | |
|---|---|---|---|
| 10,917,152 B2* | 2/2021 | Yoshimura | H04B 7/0617 |
| 2011/0044196 A1* | 2/2011 | Ishii | H04L 1/1692 370/252 |
| 2013/0279437 A1* | 10/2013 | Ng | H04W 16/14 370/329 |
| 2017/0086153 A1* | 3/2017 | Yoon | H04W 56/001 |
| 2017/0215160 A1 | 7/2017 | Löhr et al. | |

(Continued)

OTHER PUBLICATIONS

International Search Report and Written Opinion—PCT/US2019/051323—ISA/EPO—dated Nov. 13, 2019.

*Primary Examiner* — Mang Hang Yeung
(74) *Attorney, Agent, or Firm* — Holland & Hart/Qualcomm Incorporated

(57) ABSTRACT

Methods, systems, and devices for wireless communications are described. A user equipment (UE) may receive signaling, such as a downlink control information (DCI), that identifies a transmission configuration state from a set of transmission configuration states, from which the UE may determine a receiver timing. The UE may then receive a downlink transmission, such as a physical downlink shared channel (PDSCH), from one or more transmission/reception points (TRPs). The UE may use the receiver timing to decode the downlink transmission by performing a fast fourier transform (FFT) with the receiver timing for the downlink transmission.

27 Claims, 13 Drawing Sheets

(56) References Cited

U.S. PATENT DOCUMENTS

2018/0288755 A1* 10/2018 Liu ...................... H04L 5/0098
2019/0261454 A1*  8/2019 Xiong ................. H04L 25/0328
2019/0306839 A1* 10/2019 Ahn ..................... H04L 5/0053

* cited by examiner

DYNAMIC RECEIVER TIMING FOR DOWNLINK TRANSMISSIONS

CROSS REFERENCE

The present application for patent claims the benefit of U.S. Provisional Patent Application No. 62/732,492 by KHOSHNEVISAN, et al., entitled "DYNAMIC RECEIVER TIMING FOR DOWNLINK TRANSMISSIONS," filed Sep. 17, 2018, assigned to the assignee hereof, and expressly incorporated herein.

INTRODUCTION

The following relates generally to wireless communications, and more specifically to managing receiver timing for transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE may receive a physical downlink control channel (PDCCH) from a transmission/reception point (TRP). The UE may decode the PDCCH and estimate a receiver fast Fourier transform (FFT) timing. The UE may then use the receiver FFT timing to perform an FFT on a physical downlink shared channel (PDSCH).

SUMMARY

A method of wireless communications at a UE is described. The method may include receiving signaling that identifies a transmission configuration state from a set of transmission configuration states configured for the UE, determining a receiver timing for a FFT for a downlink transmission from one or more TRPs, receiving the downlink transmission from the one or more TRPs, and decoding the downlink transmission based on the receiver timing.

An apparatus for wireless communications at a UE is described. The apparatus may include a processor, memory in electronic communication with the processor, and instructions stored in the memory. The instructions may be executable by the processor to cause the apparatus to receive signaling that identifies a transmission configuration state from a set of transmission configuration states configured for the UE, determine a receiver timing for a FFT for a downlink transmission from one or more TRPs, receive the downlink transmission from the one or more TRPs, and decode the downlink transmission based on the receiver timing.

Another apparatus for wireless communications at a UE is described. The apparatus may include means for receiving signaling that identifies a transmission configuration state from a set of transmission configuration states configured for the UE, determining a receiver timing for a FFT for a downlink transmission from one or more TRPs, receiving the downlink transmission from the one or more TRPs, and decoding the downlink transmission based on the receiver timing.

A non-transitory computer-readable medium storing code for wireless communications at a UE is described. The code may include instructions executable by a processor to receive signaling that identifies a transmission configuration state from a set of transmission configuration states configured for the UE, determine a receiver timing for a FFT for a downlink transmission from one or more TRPs, receive the downlink transmission from the one or more TRPs, and decode the downlink transmission based on the receiver timing.

Some examples of the method, apparatuses, and non-transitory computer-readable medium described herein may further include operations, features, means, or instructions for determining a default receiver timing based on the transmission configuration state being associated with a downlink control channel for the UE.

Some examples of the method, apparatuses, and non-transitory computer-readable medium described herein may further include operations, features, means, or instructions for detecting a first arrival path (FAP) of a reference signal corresponding to a downlink control resource set allocated for the UE and determining the receiver timing based on the FAP.

In some examples of the method, apparatuses, and non-transitory computer-readable medium described herein, the reference signal may be quasi co-located with the downlink control resource set.

In some examples of the method, apparatuses, and non-transitory computer-readable medium described herein, the downlink control resource set may be associated with a lowest control resource set identifier (ID) of a set of control resource set IDs.

Some examples of the method, apparatuses, and non-transitory computer-readable medium described herein may further include operations, features, means, or instructions for determining a default receiver timing based on a subset of transmission configuration states activated by a medium access control (MAC) control element (MAC-CE).

Some examples of the method, apparatuses, and non-transitory computer-readable medium described herein may further include operations, features, means, or instructions for jointly detecting a FAP of one or more reference signals associated with the subset of transmission configuration states activated via a MAC-CE.

Some examples of the method, apparatuses, and non-transitory computer-readable medium described herein may further include operations, features, means, or instructions for detecting respective FAPs for each reference signal of the one or more reference signals and determining the default receiver timing based on an earliest FAP of the respective FAPs.

Some examples of the method, apparatuses, and non-transitory computer-readable medium described herein may further include operations, features, means, or instructions for combining a set of power delay profiles (PDPs) estimated from the reference signals associated with the subset of transmission configuration states and estimate a FAP for the combined set of PDPs, where the default receiver timing may be determined based on the estimated FAP.

Some examples of the method, apparatuses, and non-transitory computer-readable medium described herein may further include operations, features, means, or instructions for determining respective receiver timings for a set of receiver ports based on the subset of transmission configuration states activated via a MAC-CE.

Some examples of the method, apparatuses, and non-transitory computer-readable medium described herein may further include operations, features, means, or instructions for determining the receiver timing based on the identified transmission configuration state.

Some examples of the method, apparatuses, and non-transitory computer-readable medium described herein may further include operations, features, means, or instructions for detecting one or more FAPs of reference signals corresponding to the set of transmission configuration states, determining that the transmission configuration state includes a single QCL relationship, selecting a FAP of the one or more FAPs based on the transmission configuration state and determining the receiver timing based on the selected FAP.

Some examples of the method, apparatuses, and non-transitory computer-readable medium described herein may further include operations, features, means, or instructions for determining that the transmission configuration state includes multiple QCL relationships, receiving multiple quasi co-located reference signals from multiple TRPs, where the multiple quasi-co located reference signals correspond to the multiple QCL relationships and determining the receiver timing based on the multiple quasi co-located reference signals.

Some examples of the method, apparatuses, and non-transitory computer-readable medium described herein may further include operations, features, means, or instructions for determining respective FAPs for the multiple quasi co-located reference signals and determining the receiver timing based on an earliest FAP of the respective FAPs.

Some examples of the method, apparatuses, and non-transitory computer-readable medium described herein may further include operations, features, means, or instructions for combining a set of PDPs associated with the multiple quasi co-located reference signals and determining the receiver timing based on the combined set of PDPs.

Some examples of the method, apparatuses, and non-transitory computer-readable medium described herein may further include operations, features, means, or instructions for receiving disjoint resource blocks from multiple TRPs and determining a respective receiver timing for each of the multiple TRPs based on the disjoint resource blocks.

In some examples of the method, apparatuses, and non-transitory computer-readable medium described herein, the disjoint resource blocks may be received via the same time resources.

Some examples of the method, apparatuses, and non-transitory computer-readable medium described herein may further include operations, features, means, or instructions for receiving a downlink control channel from the one or more TRPs and identifying the transmission configuration state based on the downlink control channel.

Some examples of the method, apparatuses, and non-transitory computer-readable medium described herein may further include operations, features, means, or instructions for determining a modulation coding scheme (MCS) after decoding the received downlink control channel and determining the receiver timing based on the MCS.

In some examples of the method, apparatuses, and non-transitory computer-readable medium described herein, the receiver timing may be determined based on a previous MCS, a reference signal signal to interference plus noise ratio (RS SINR), or both.

Some examples of the method, apparatuses, and non-transitory computer-readable medium described herein may further include operations, features, means, or instructions for determining a second receiver timing for a second downlink transmission from the one or more TRPs.

Some examples of the method, apparatuses, and non-transitory computer-readable medium described herein may further include operations, features, means, or instructions for identifying a second transmission configuration state for the second downlink transmission, where the second receiver timing may be determined based on the second transmission configuration state.

Some examples of the method, apparatuses, and non-transitory computer-readable medium described herein may further include operations, features, means, or instructions for determining a priority associated with the downlink transmission and the second downlink transmission and determining the receiver timing of the second receiver timing based on the priority.

In some examples of the method, apparatuses, and non-transitory computer-readable medium described herein, the downlink transmission includes a shared downlink transmission and the second downlink transmission includes a semi-persistent shared downlink transmission or a channel state reference signal.

DETAILED DESCRIPTION

Figure 1:
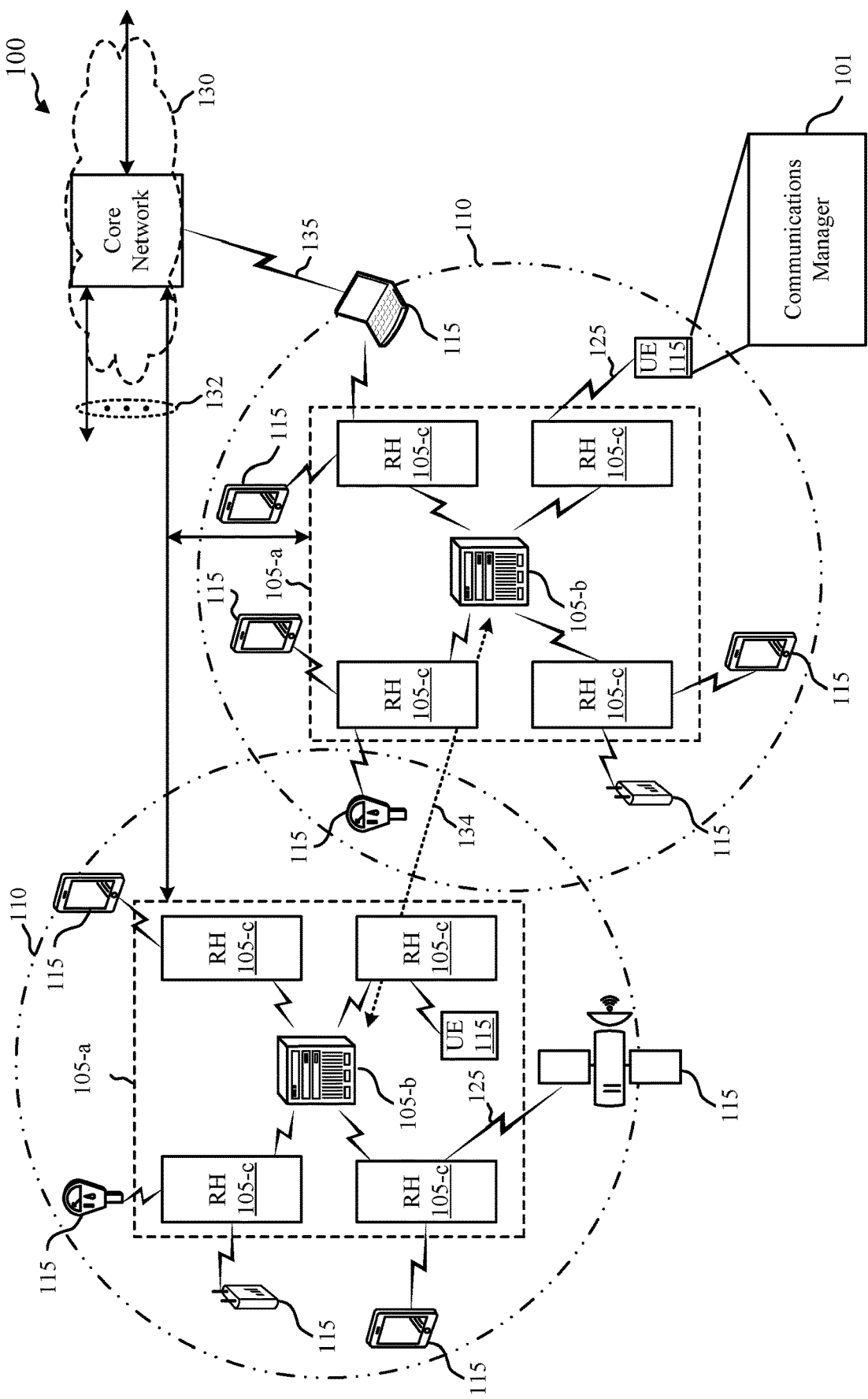
FIG. 1 illustrates an example of a wireless communications system that supports dynamic receiver timing for downlink transmissions in accordance with one or more aspects of the present disclosure.

In some cases, a UE may receive a physical downlink control channel (PDCCH) from a transmission/reception point (TRP) or panel. The UE may decode the PDCCH and estimate a receiver fast Fourier transform (FFT) timing. The UE may then use the receiver FFT timing to perform an FFT on a physical downlink shared channel (PDSCH). However, in certain cases it may be inefficient to wait to perform FFT on the PDSCH until after the PDCCH has been decoded. Further, in some cases, multiple TRPs may transmit signals to the UE concurrently via multi-TRP transmissions. Multi-TRP transmissions may be associated with multiple quasi co-location (QCL) relationships. The multiple QCL relationships may correspond to multiple reference signals associated with the respective TPRs. Techniques that consider only a single QCL relationship in multi-TRP transmissions may produce inaccurate FFT timing results with multi-TRP transmissions.

As described herein, one or more network devices (e.g., TRPs) may transmit a PDCCH to a UE. The PDCCH may contain a downlink control information (DCI) that specifies (e.g., contains) a transmission control indicator (TCI) field. In the case of a single TCI state (e.g., single-TRP or single-panel PDSCH transmission), the TCI field in the DCI indicates a single TCI state. In some cases (e.g., multi-TRP and/or multi-panel PDSCH transmission), the TCI field in the DCI may indicate multiple TCI states including multiple reference signal (RS) sets which are linked by a QCL relationship to a corresponding number of PDSCH demodulation RS (DM-RS) port groups. These PDSCH DM-RS port groups may be used to transmit a PDSCH to the UE. Once the UE receives the PDSCH, it may utilize a receiver FFT timing derived based on information included in the TCI state(s) to perform an FFT on the PDSCH.

In some cases, the UE may receive the PDSCH and perform FFT on the PDSCH before decoding the PDCCH. To do so, the UE may use a default receiver FFT timing. In one example, the UE may derive the default receiver timing from a TCI state configuration for the PDCCH. For example, the TCI state configuration for PDCCH may be a default TCI state used for PDCCH QCL indication of a particular control resource set (CORESET) identifier (ID) (e.g., the lowest CORESET ID). The UE may obtain a FAP from a RS QCLed with the particular CORESET. The UE may then use the FAP to obtain a default receiver FFT timing, which it may then use for performing FFT for the PDSCH. Alternatively, the UE may obtain the default receiver FFT timing based on all or some of the TCI states activated by a MAC-CE. In some cases, a MAC-CE may specify a number of activated TCI states (e.g., the number of activated TCI states may be TCI states associated with different QCL relationships between RS sets and DM-RS port groups). The UE may determine an FAP for each of the RSs included in each activated TCI state and choose the earliest (i.e., conservative) FAP. Alternatively, the UE may determine a composite PDP associated with the activated TCI states and may estimate the default receiver FFT timing based on the composite PDP. In cases where different receiving (Rx) ports or panels of the UE receive signals from different numbers of network devices and/or TCI states, the UE may determine a receiver FFT timing for each Rx port according to the FAP or composite PDP. The UE may then perform FFT for the PDSCH over the number of receiver FFT timings.

In other cases, the UE may receive a TCI state through decoding the PDCCH, or other means, and may use FFT timing associated with the received TCI state for FFT timing. If the UE has estimated FAPs associated with each activated TCI state, the UE may choose a FAP corresponding to the received TCI state. In cases where multiple network devices are engaging in concurrent communications (e.g., multi-TRP communications) with the UE, the received TCI state may be associated with multiple QCL relationships. In such cases, a UE may desire to account for each QCL relation of the multiple QCL relations when determining receiver FFT timing. The UE may then, for instance, determine the FAP from each RS of each QCL relation and use the earliest FAP for the receiver FFT timing. Alternatively, the UE may determine the PDP from each RS of each QCL relation and obtain a composite PDP to estimate the FAP, which may then be further used to determine FFT timing. In cases where different Rx ports or panels of the UE receive signals from different numbers of RSs of the received TCI state, the UE may determine a receiver FFT timing for each Rx port according to the FAP or composite PDP. The UE may then perform FFT for the PDSCH for the number of receiver FFT timings. If two or more network devices associated with the TCI state transmit disjoint RBs in the same slot and/or symbol, the UE may determine a separate receiver FFT timing for each set of RBs (where each set of RBs may be associated with a network device). In some cases, the UE may use two separate receiver FFT timings based on multiple QCLs being indicated in the received TCI state. The UE may then perform two FFTs for the PDSCH. The UE may also choose an FFT timing scheme based on a MCS received in the PDCCH. For instance, when the MCS is low, the UE may assume that FFT timing from any of the QCL relationships is approximately equivalent and choose either. Alternatively, the UE may obtain a default receiver FFT timing. In cases where the UE has not yet decoded the PDCCH (e.g., and thus not received a TCI state indication), the UE may choose a scheme based on previously received MCSs or RS signal to noise ratios (SINRs).

In some cases, one or more network devices may transmit PDSCH and one or more network devices may transmit CSI-RS. In cases where CSI-RS is on a separate symbol from PSDCH, the techniques described herein (e.g., using a default receiver timing derived from a PDCCH TCI configuration or a MAC-CE; or determining the receiver timing from a received TCI with the conservative FAP or composite PDP) for obtaining receiver FFT timings from PDSCH transmissions may be applied to CSI-RS processing. In other cases, where CSI-RS is multiplexed with PDSCH in frequency and both PDSCH and CSI-RS are associated with a different TCI state, the UE may determine receiver FFT timing by considering TCI states associated with both. For instance, the UE may determine the receiver FFT timing by obtaining composite PDPs from the TCI states associated with both the PDSCH and the CSI-RS. Alternatively, the UE may determine that either transmission has a higher priority and determine the receiver FFT timing based on the TCI state associated with the transmission of higher priority. Similarly, a UE may receive a PDSCH (e.g., a dynamic PDSCH) and another channel (e.g., a SPS PDSCH) and may choose to use joint timing (e.g., determining a composite PDP associated with the TCI states corresponding to both transmissions) or may choose timing corresponding to which channel has the higher priority.

Aspects of the disclosure are initially described in the context of a wireless communications system. Examples of receiver FFT timing TRP configurations and a process flow are then provided to illustrate additional aspects of the disclosure. Aspects of the disclosure are further illustrated by and described with reference to apparatus diagrams, system diagrams, and flowcharts that relate to dynamic receiver timing for downlink transmissions.

FIG. 1 illustrates an example of a wireless communications system 100 that supports elevation restriction beamforming in wireless systems in accordance with one or more aspects of the present disclosure. The wireless communications system 100 includes network devices 105 (e.g., gNodeBs (gNBs), TRPs, and/or radio heads (RHs)), UEs 115, and a core network 130. In some examples, the wireless communications system 100 may be an LTE network, an LTE-A network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads) or a TRP. In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a TRP. In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA)

or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may be configured (e.g., by RRC signaling) with up to M TCI states, which may be used for QCL indication. UE 115-a may use a MAC-CE to select up to $2^N$ TCI states (e.g., 8 states where N=3) out of the M configured ones, which may be used for PDSCH QCL indication. For example, a MAC-CE transmitted from a base station may list $2^N$ states as activated and M−$2^N$ as deactivated. For $2^N$ TCI states, N bits in a DCI may dynamically indicate the TCI state for a corresponding PDSCH transmission. In some cases, a downlink control channel (e.g., a PDCCH) may carry the DCI.

A TCI state may refer to one or more (e.g., two) RS sets which indicate a QCL relationship for one or two demodulation RS DM-RS port group(s) (e.g., of the PDSCH), respectively. Such a QCL relationship may, for instance, be that a port transmitting downlink RSs may have approximately equivalent channel characteristics as the ports of a port group transmitting DM-RS. The channel characteristics which are approximately equivalent may be listed in a QCL type. The QCL types to which each downlink RS corresponds may be: type A, consisting of equivalent Doppler shift, Doppler spread, average delay, and delay spread; type B, consisting of equivalent Doppler shift and Doppler spread; type C, consisting of equivalent Doppler shift and average delay; or type D, consisting of equivalent spatial reception parameters. If the TCI state refers to two RS sets, each RS set may have a different QCL relationship (e.g., each RS set may be mapped to a distinct port). Further, when the TCI state refers to two sets, either one or both of the corresponding DM-RS port groups in combination may be used to transmit signaling associated with a PDSCH.

Each RS set may contain a reference to one or two downlink RSs. Each of the one or two downlink RSs may be a synchronization signal block (SSB), an aperiodic control state information RS (AP-CSI-RS), a periodic CSI-RS (P-CSI-RS), a semi-persistent CSI-RS (SP-CSI-RS), or a tracking reference signal (TRS). When configured in a TCI state, a TRS may be used as a RS for downlink timing and may correspond to QCL type A or QCL type C. A TRS in a particular TCI state may use a separate tracking loop (with a separate time, frequency, Doppler, and/or delay) from that used by a TRS in another TCI state.

Wireless communications system 100 may support efficient techniques for determining a receiver FFT timing for TRP transmissions. For example, a UE 115 may receive signaling (e.g., a DCI) that indicates a TCI state or states from a set of activated TCI states. The activated TCI states may be determined from a MAC-CE. The UE 115 may determine a receiver FFT timing for a downlink transmission (e.g., a PDSCH) from one or more TRPs. In some cases, the UE may determine a default receiver FFT timing before the signaling that indicates the TCI state is decoded and may use the default receiver FFT timing as the receiver FFT timing. In other cases, the UE may decode the signaling, determine the TCI states, and determine a receiver FFT timing based on the number of QCL relationships the TCI field includes. The UE 115 may receive the downlink transmission from the one or more TRPs. After receiving the downlink transmission, the UE may decode the downlink transmission based on the receiver FFT timing.

UEs 115 may include a communications manager 101, which may receive signaling that identifies a transmission configuration state from a set of transmission configuration states configured for the UE, determine a receiver timing for an FFT for a downlink transmission from one or more TRPs, receive the downlink transmission from the one or more TRPs, and decode the downlink transmission based on the receiver timing.

Figure 2:
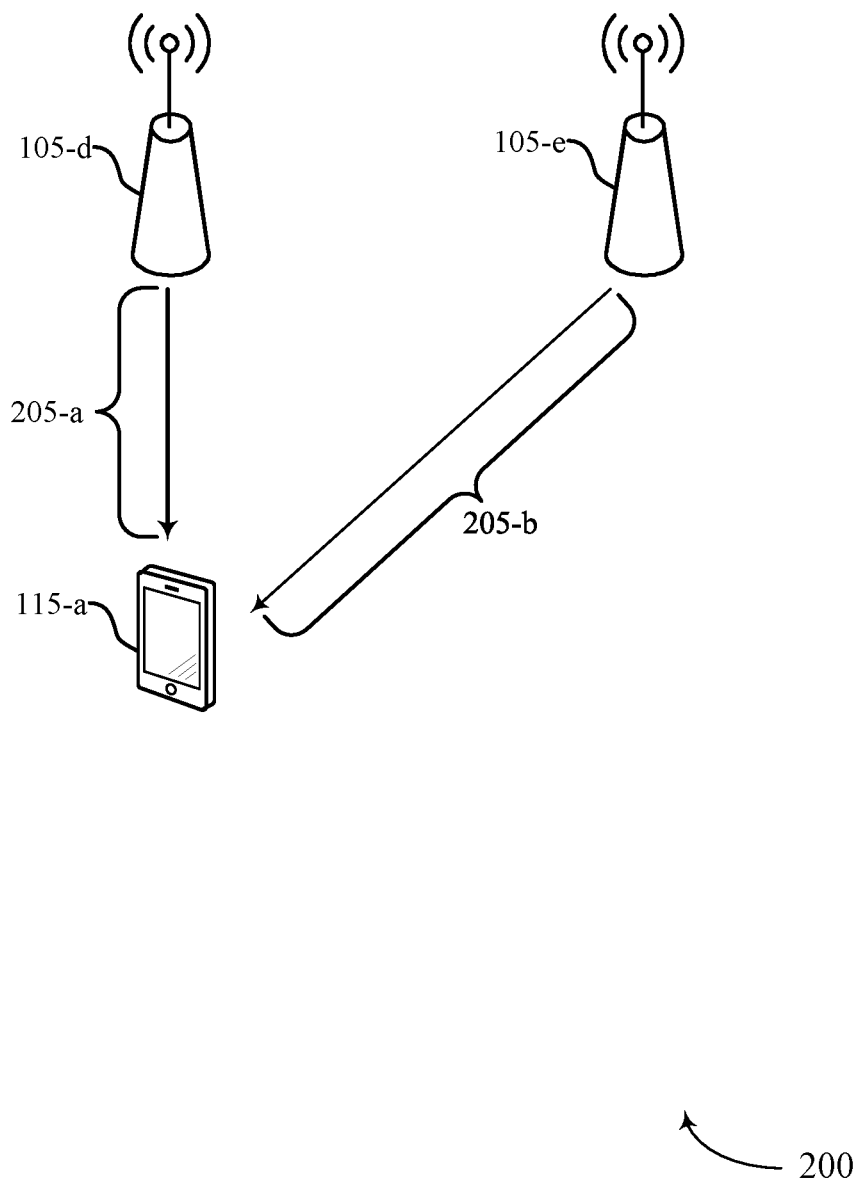
FIG. 2 illustrates an example of a receiver FFT timing TRP configuration that supports dynamic receiver timing for downlink transmissions in accordance with one or more aspects of the present disclosure.

FIG. 2 illustrates an example of a receiver FFT timing TRP configuration 200 that supports dynamic receiver timing for downlink transmissions in accordance with one or more aspects of the present disclosure. In some examples, receiver FFT timing TRP configuration 200 may implement aspects of wireless communication system 100. Receiver FFT timing TRP configuration 200 may implement aspects of wireless communications system 100. Receiver FFT timing TRP configuration 200 may include TRPs 105-d and 105-e and a UE 115-a, which may be examples of network devices 105 and UEs 115, respectively, as described above with reference to FIG. 1.

In some cases, UE 115-a may be served by multiple TRPs 105 (e.g., TRP 105-d and TRP 105-e), and the multiple TRPs 105 may transmit and/or receive data from the UE concurrently (e.g., multiple TRPs 105 may transmit a PDSCH concurrently). Such transmissions may be called multi-TRP transmissions. The multi-TRP transmissions may utilize one beam from each TRP or multiple beams from each TRP to transmit signals. In some cases, different TRPs 105 and/or different beams of the TRPs 105 may be associated with different QCL relationships and/or different TCIs. Further, each TRP 105 or beam-paired link may undergo different physical propagation paths and have different time delays (e.g., the propagation delay 205-*a*, associated with a first default timing, may be shorter than the propagation delay 205-*b*, associated with a second default timing). Since each TRP 105 may have different time delays, the different TCIs (e.g., when associated with different TRPs 105) may be associated with different receiver timing (e.g., for FFT operation). In some cases, (e.g., in multi-TRP PDCCH transmissions), a DM-RS port group of TRP 105-*d* may be considered a first DM-RS port group and a DM-RS port group of the other TRP 105-*e* may be considered a second DM-RS port group. As such, a single TCI state may contain a pair of QCL relations (e.g., a first RS set associated with the first port group and a second RS set associated with the second port group).

In some cases, UE 115-*a* may only be aware of the TCI state of the PDSCH when decoding PDCCH, as the PDSCH may come from any of the TRPs 105 serving UE 115-*a*. However a receiver may not wish to wait (e.g., when fast pipelining on receiving processing is desired) to perform FFT for the PDSCH until after the PDCCH is decoded and the TCI state is extracted. UE 115-*a* may, thus, obtain a default receiver FFT timing (e.g., before the PDCCH is decoded) to be used for performing FFT for the PDSCH. In some cases, the receiver default FFT timing may be different from the receiver FFT timings associated with propagation delay 205-*a* and propagation delay 205-*b*. However, the receiver default FFT timing may provide a close enough approximation to adequately perform FFT.

For instance, UE 115-*a* may derive and use a default receiver FFT timing from a TCI state configuration for the PDCCH. The TCI state configuration may be a default TCI state used for PDCCH QCL indication of a CORESET ID (e.g., the lowest CORESET ID) in a particular slot (e.g., the latest slot in which one or more CORESETs are configured for the UE). The UE may derive the default receiver FFT timing based on a FAP detection from a RS which is QCLed with the PDCCH CORESET in that slot. In some cases (e.g., if the offset between UE 115-*a*'s reception of DCI in the PDCCH and the PDSCH is less than a threshold scheduling offset value), UE 115-*a* may assume that the DM-RS ports of PDSCH are QCLed with the RSs in the default TCI state. Thus, the receiver FFT timing based on the default TCI state of the PDCCH may be used for performing FFT for PDSCH. If multiple values for a threshold scheduling offset value are available, the threshold may be determined based on UE capability.

Additionally or alternatively, UE 115-*a* may derive the default receiver FFT timing based on all or some of the TCI states activated by the MAC-CE. For instance, UE 115-*a* may derive the default receiver FFT timing based on a joint FAP detection of each of the RSs included in each TCI state activated by the MAC-CE. The UE may determine a FAP of each RS and use the earliest (i.e., conservative) FAP to derive the default receiver FFT timing. The UE may also obtain a FAP by combining the FAPs together. In some cases, the number of RS sets may be greater than the number of TCI states (e.g., a particular TCI state may have more than one RS set). In such cases, the UE may consider a FAP for each RS set of the activated TCIs and choose the earliest FAP. Additionally or alternatively, the UE may determine the default FFT timing based on the PDP for some or all of the $2^N$ TCI states (e.g., $2^N$ PDPs) activated by the MAC-CE. UE 115-*a* may then combine the PDPs together (e.g., average them) to obtain a composite PDP and estimate a FAP based on the composite PDP, which may then be used to derive a default receiver FFT timing. As stated herein, each TCI state may contain multiple QCL relationships (e.g., if there are more than one RS sets). Thus, if there are multiple RS sets in a TCI state, UE 115-*a* may obtain a PDP for each RS within the RS set within each TCI and combine them to obtain the composite PDP. In some cases (e.g., when there are mmW transmissions), different Rx ports or panels of UE 115-*a* may be able to receive signals from different TCI states and/or different TRPs. In such cases, the UE 115-*a* may determine FFT timing for each Rx port or panel according to the earliest FAP or a combined PDP of the TCI states associated with the signals that each Rx port or panel may receive.

In some cases, UE 115-*a* may decode the PDCCH or elsewise obtain the TCI for PDSCH before performing FFT for the PDSCH. In some cases, (e.g., if the indicated TCI state only includes one QCL relation, such as in a single TRP transmission), UE 115-*a* may derive the receiver FFT timing from a single RS set. If the UE has estimated the a FAP associated with each TCI state is activated by a MAC-CE, UE 115-*a* may choose the FAP associated with the indicated TCI state. In other cases (e.g., if the indicated TCI state includes more than one QCL relation), UE 115-*a* may derive FFT timing from multiple RS sets. For example, UE 115-*a* may use the multiple QCLed RSs from each RS set obtain the timing for the indicated TCI state. In one example, the UE may determine the FAP from each RS of each RS set of the indicated TCI state and use the conservative FAP to derive the default FFT timing. Alternatively, UE 115-*a* may determine the PDP from each RS of the RS sets of the indicated TCI state and combine them together (e.g., average them) to obtain a composite PDP, which may be used to estimate a FAP and/or a default FFT timing. If UE 115-*a* determines that the FFT timing may be determined separately for each Rx port or panel, UE 115-*a* may determine FFT timings for each of its Rx ports or panels, with each Rx port receiving a number of RSs associated with the indicated TCI state.

In some cases, multiple TRPs 105 (e.g., TRP 105-*d* and TRP 105-*e*) in multi-TRP communication with UE 115-*a* may transmit disjoint RBs in the same slot and/or symbol. In this case, UE 115-*a* may consider multiple receiver FFT timing for the set of RBs associated with each TRP 105 (e.g., a first set of RBs for TRP 105-*d* and a second set of RBs for TRP 105-*e*). UE 115-*a* may thus determine multiple (e.g., 2 in the case of TRP 105-*d* and TRP 105-*e*) FFT timings and perform two FFTs on PDSCH based on the two FFT timings. Performing the FFT with the two FFTs may increase FFT accuracy. In some cases, the multiple TRPs may be associated with separate QCL relationships defined in a single TCI state.

Additionally, UE 115-*a* may decide on an FFT timing scheme, after decoding PDCCH, based on an MCS received in the PDCCH. For instance, when the MCS indicates a low value, UE 115-*a* may consider receiver FFT timing from the TRPs 105 (e.g., associated with the indicated TCI to be approximately equivalent and choose the receiver FFT timing associated with any of the TRPs 105. Alternatively, UE 115-*a* may obtain the default receiver FFT timing using the methods described herein. In some cases (e.g., if UE 115-*a* abstains from waiting to perform FFT for PDSCH until after the PDCCH is decoded), UE 115-*a* may choose the FFT timing scheme based on previously determined MCSs or RS SINRs.

Figure 3A:
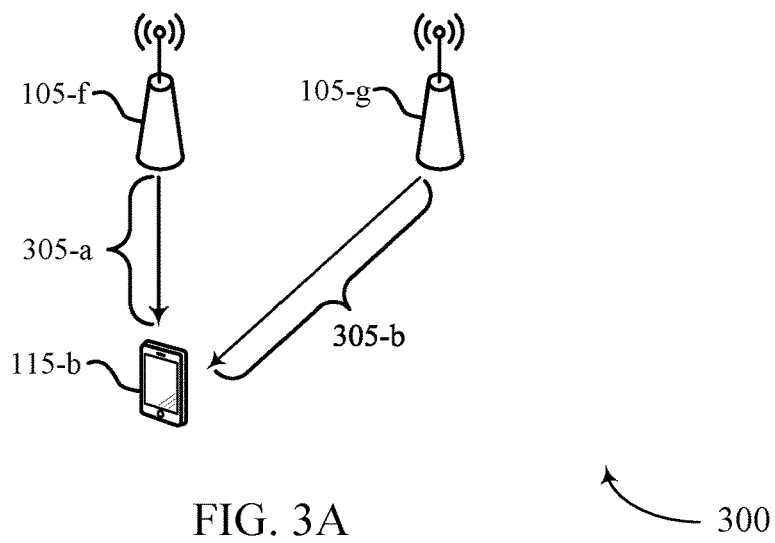
FIGS. 3A, 3B, and 3C illustrate examples of receiver FFT timing TRP configurations that support dynamic receiver timing for downlink transmissions in accordance with one or more aspects of the present disclosure.
Figure 3B:
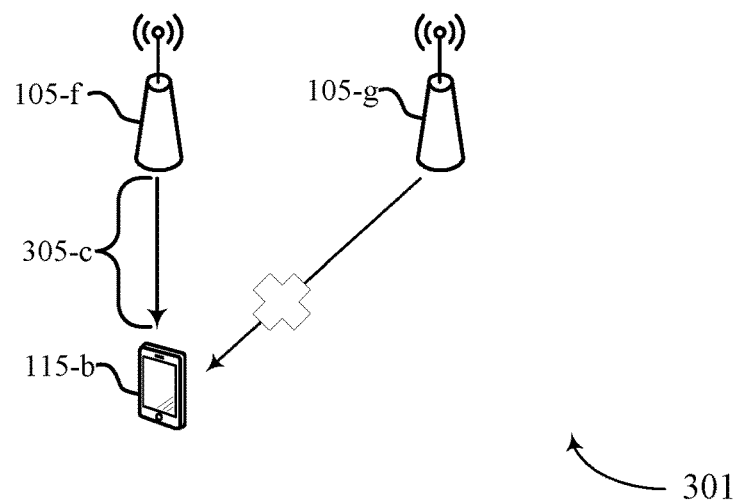
Figure 3C:
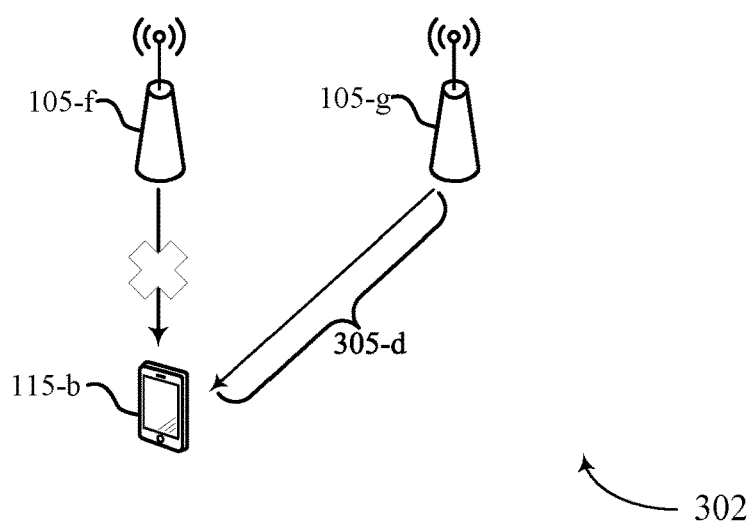

FIGS. 3A, 3B, and 3C illustrate examples of receiver FFT timing TRP configurations 300, 301, and 302 that support dynamic receiver timing for downlink transmissions in accordance with one or more aspects of the present disclosure. In some examples, receiver FFT timing TRP configurations 300, 301, and 302 may implement aspects of wireless communication system 100. Receiver FFT timing TRP configurations 300, 301, and 302 may include TRPs 105-*f* and 105-*g* and a UE 115-*b*, which may be examples of network devices 105 and UEs 115, respectively, as described above with reference to FIG. 1.

In receiver FFT timing TRP configuration 300, TRP 105-*f* and 105-*g* may both be serving (e.g., concurrently transmitting PDSCH to) UE 115-*b*. UE 115-*b* may determine that both TRP 105-*f* and 105-*g* are serving UE 115-*b* based on a TCI for the PDSCH, indicated in PDCCH or otherwise. Transmissions from TRP 105-*f* may have a propagation delay 305-*a* associated with a first receiver FFT timing and transmissions from TRP 105-*g* may have a propagation delay 305-*b* associated with a second receiver FFT timing. In some cases, propagation delay 305-*a* and propagation delay 305-*b* may have different values. After UE 115-*b* determines that both TRP 105-*f* and TRP 105-*g* are serving UE 115-*b*, UE 115-*b* may determine a receiver FFT timing which may be distinct from the receiver FFT timings associated with either TRP 105-*f* or TRP 105-*g*. For instance, UE 115-*b* may calculate the conservative FAP or a composite PDP as described herein and estimate the receiver FFT timing from either. Alternatively, UE 115-*b* may choose either the first receiver FFT timing associated with propagation delay 305-*a* or the second receiver FFT timing associated with propagation delay 305-*b*. In some cases, UE 115-*b* may choose the FFT timing based on a low MCS or RS SINR. After determining the receiver FFT timing, UE 115-*b* may perform FFT on the PDSCH with the determined receiver FFT timing.

In receiver FFT timing TRP configuration 301, only TRP 105-*f* may be serving (e.g., transmitting PDSCH to) UE 115-*b*. UE 115-*b* may determine that only TRP 105-*f* is serving UE 115-*b* based on a TCI for the PDSCH, indicated in PDCCH or otherwise. Transmissions from TRP 105-*f* to UE 115-*b* may have a propagation delay 305-*c* associated with a receiver FFT timing. UE 115-*b* may determine the receiver timing based on the FAP associated with the RS set indicated by the TCI. UE 115-*b* may then perform FFT on the PDSCH with the receiver FFT timing associated with TRP 105-*f*.

In receiver FFT timing TRP configuration 302, only TRP 105-*g* may be serving (e.g., transmitting PDSCH to) UE 115-*b*. UE 115-*b* may determine that only TRP 105-*g* is serving UE 115-*b* based on a TCI for the PDSCH, indicated in PDCCH or otherwise. Transmissions from TRP 105-*g* to UE 115-*b* may have a propagation delay 305-*d* associated with a receiver FFT timing. UE 115-*b* may determine the receiver timing based on the FAP associated with the RS set indicated by the TCI. UE 115-*b* may then perform FFT on the PDSCH with the receiver FFT timing associated with TRP 105-*g*.

Figure 4:
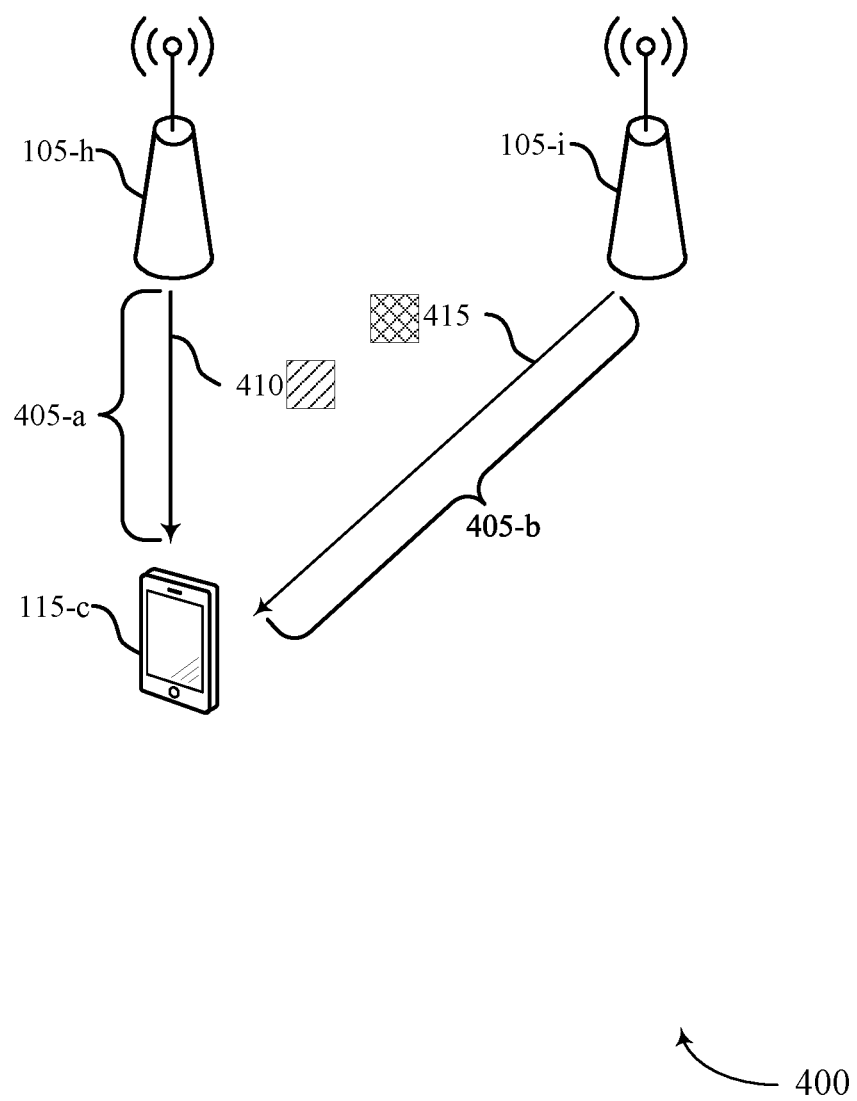
FIG. 4 illustrates an example of a receiver FFT timing TRP configuration that supports dynamic receiver timing for downlink transmissions in accordance with one or more aspects of the present disclosure.

FIG. 4 illustrates an example of a receiver FFT timing TRP configuration 400 that supports dynamic receiver timing for downlink transmissions in accordance with one or more aspects of the present disclosure. In some examples, receiver FFT timing TRP configuration 400 may implement aspects of wireless communication system 100. Receiver FFT timing TRP configuration 400 may include TRPs 105-*h* and 105-*i* and a UE 115-*c*, which may be examples of network devices 105 and UEs 115, respectively, as described above with reference to FIG. 1.

In some cases, TRP 105-*h* may transmit a PDSCH 410 and TRP 105-*i* may transmit a transmission 415. PDSCH 410 may be associated with a propagation delay 405-*a* and transmission 415 may be associated with propagation delay 405-*b*. In some cases, propagation delay 405-*a* and propagation delay 405-*b* may have different values. Propagation delays 405-*a* and 405-*b* may be associated with a first FFT receiver timing and a second FFT receiver timing, respectively.

In some aspects, transmission 415 may be a CSI-RS transmission and may be sent on a separate symbol from PDSCH 410. In such aspects, UE 115-*a* may determine receiver FFT timing through the same methods (e.g., using a default receiver timing derived from a PDCCH TCI configuration or a MAC-CE; or determining the receiver timing from an indicated TCI with the conservative FAP or composite PDP) used to determine receiver FFT timing for two TRPs 105 transmitting PDSCH.

In other aspects, transmission 415 may be a CSI-RS that is multiplexed in frequency with a PDSCH. Further, the CSI-RS and the PDSCH may have different TCI states. In one example, UE 115-*c* may determine receiver FFT timing from the composite PDP associated with the TCI state corresponding to the PDSCH and the TCI state corresponding to the CSI-RS. UE 115-*c* may derive a FAP from the composite PDP and may further derive a receiver FFT timing from the FAP. In another example, UE 115-*c* may determine that the CSI-RS transmission has a higher priority than the PDSCH 410 and may determine the receiver FFT timing based on the CSI-RS TCI configuration. An advantage of obtaining receiver FFT timing this way is that it may enable UE 115-*c* to support high MCS or to reduce timing jitter for CSI-RS processing (e.g., due to the potentially different TCI states used for PDSCH scheduling). In another example, UE 115-*c* may determine that the PDSCH 410 has a higher priority than the CSI-RS transmission and may determine the receiver FFT timing based on the PDSCH TCI configuration. Obtaining receiver FFT timing this way may increase PDSCH performance.

In other aspects, transmission 415 may be a channel separate from the PDSCH 410. For instance, the PDSCH 410 may be a dynamic PDSCH and transmission 415 may be a semi-persistent scheduling (SPS) PDSCH which may be used, for instance, in an ultra-reliable low-latency communications (URLLC) application. In such aspects, UE 115-*a* may choose to use joint timing techniques (e.g., determining a composite PDP associated with the TCI states corresponding to both transmissions) or may choose timing corresponding to which channel has the higher priority.

Figure 5:
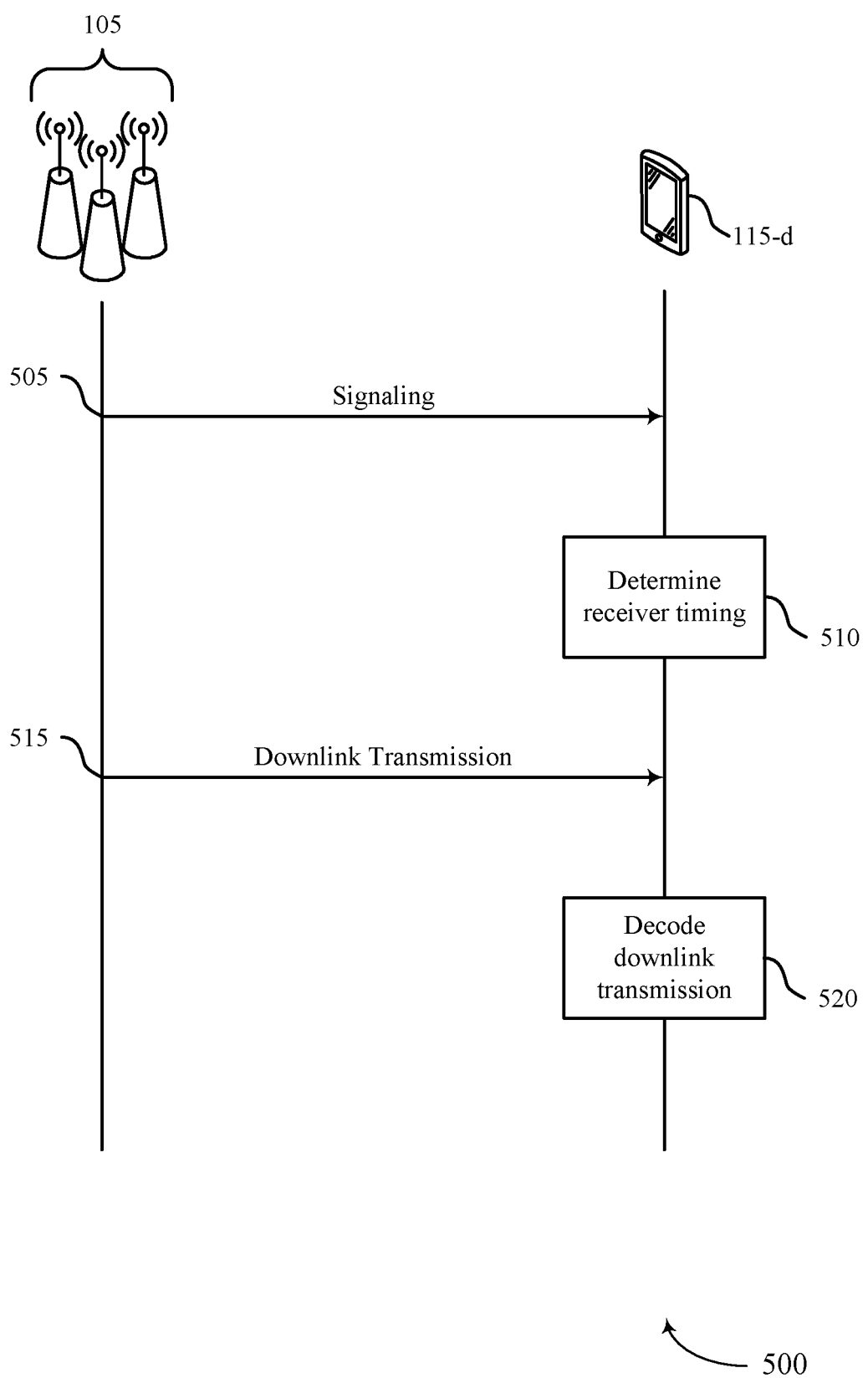
FIG. 5 illustrates an example of a flow process that supports dynamic receiver timing for downlink transmissions in accordance with aspects of one or more the present disclosure.

FIG. 5 illustrates an example of a process flow 500 that supports dynamic receiver timing for downlink transmissions in accordance with one or more aspects of the present disclosure. In some examples, process flow 500 may implement aspects of wireless communication system 100. Process flow 500 may include TRPs 105 and a UE 115-*d*, which may be examples of network devices 105 and UEs 115, respectively, as described above with reference to FIG. 1.

At 505, one or more TRPs 105 may transmit signaling (e.g., a DCI) that identifies one or more transmission configuration states (e.g., TCI(s) in a TCI field of the DCI) from a set of transmission configuration states configured for the UE. In some cases, the set of transmission configuration states may be chosen from a MAC-CE. In particular, a MAC-CE may list activated transmission configuration states that UE 115-*d* may choose from. In some cases, the activated states may correspond to different TRPs or different beams. In some cases, UE 115-*d* may receive and decode the signaling. In other cases, UE 115-*d* may perform 510 without decoding the signaling.

At 510, UE 115-*d* may determine a receiver timing (e.g., a receiver FFT timing) for an FFT for a downlink transmission (e.g., a PDSCH) from one or more TRPs 105. In some cases, UE 115-*d* may determine the receiver timing based on the transmission configuration state being associated with a downlink control channel (e.g., a PDCCH). For instance, UE 115-*d* may derive the receiver FFT timing based on a FAP detection from a RS which is QCLed with the downlink channel CORESET in that slot. Additionally or alternatively, UE 115-*d* may determine the receiver timing based on some or all of the configured transmission configuration states, which may be activated by a MAC-CE. UE 115-*d* may do so by determining the receiver timing based on an earliest FAP or a composite PDP of the RSs in some or all of the configured transmission configuration states. Additionally or alternatively, UE 115-*d* may determine the receiver timing based on decoding the signaling identifying transmission configuration state. For example, the identified transmission configuration state may contain a single QCL relationship and may have a corresponding FAP associated with it that UE 115-*d* may derive the receiver timing from. In another example, the identified transmission configuration state may contain multiple QCL relationships, in which case UE 115-*d* may determine the receiver timing based on an earliest FAP or a composite PDP of some or all of the RSs in the identified transmission configuration state.

At 515, one or more TRPs may transmit the downlink transmission from one or more TRPs 105. In some cases, UE 115-*d* may receive the downlink transmission. At 520, UE 115-*d* may decode the downlink transmission based on the receiver timing.

Figure 6:
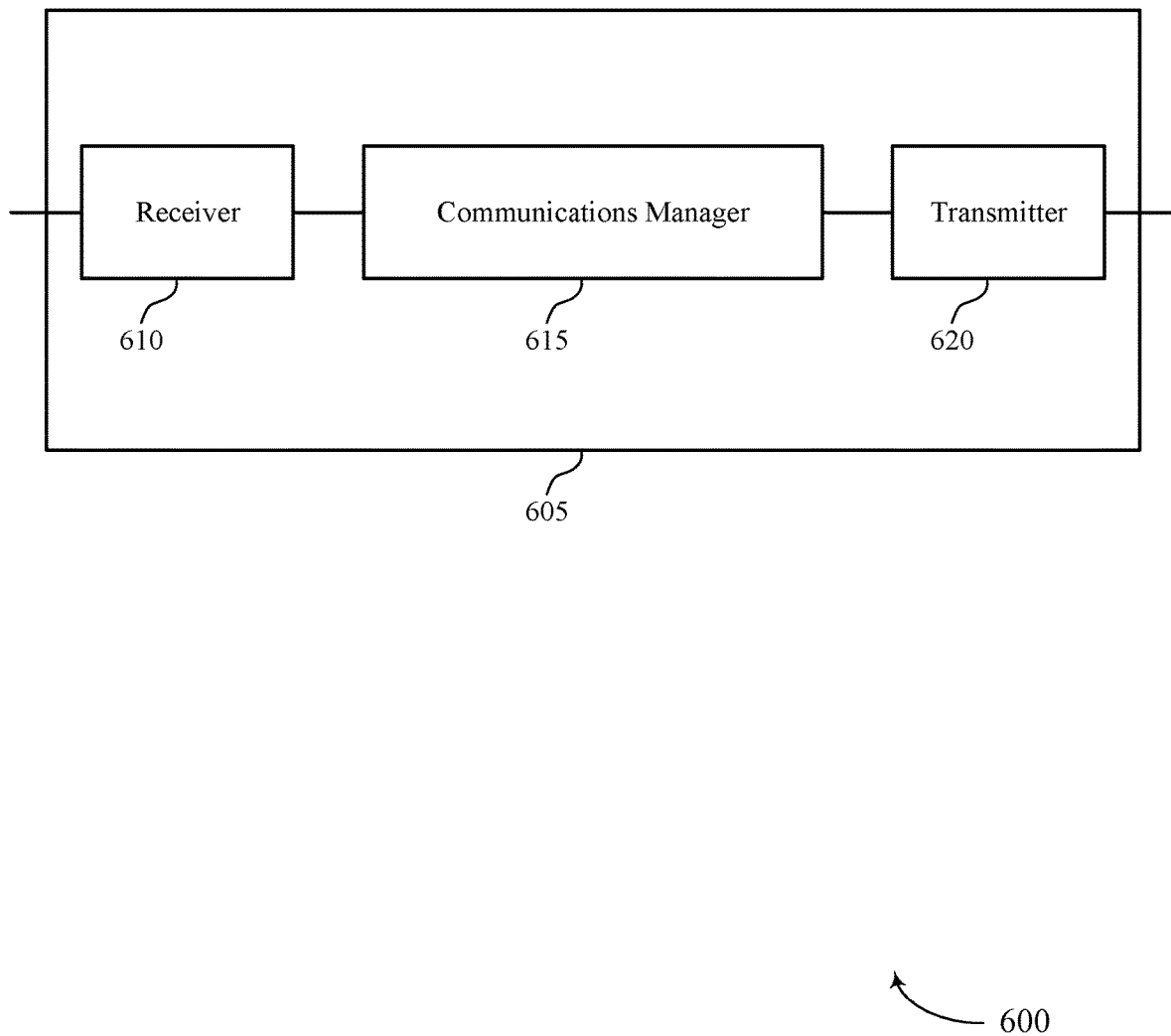
FIGS. 6 and 7 show block diagrams of devices that support dynamic receiver timing for downlink transmissions in accordance with one or more aspects of the present disclosure.

FIG. 6 shows a block diagram 600 of a device 605 that supports dynamic receiver timing for downlink transmissions in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to dynamic receiver timing for downlink transmissions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive signaling that identifies a transmission configuration state from a set of transmission configuration states configured for the UE, determine a receiver timing for a FFT for a downlink transmission from one or more TRPs, receive the downlink transmission from the one or more TRPs, and decode the downlink transmission based on the receiver timing. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with one or more aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
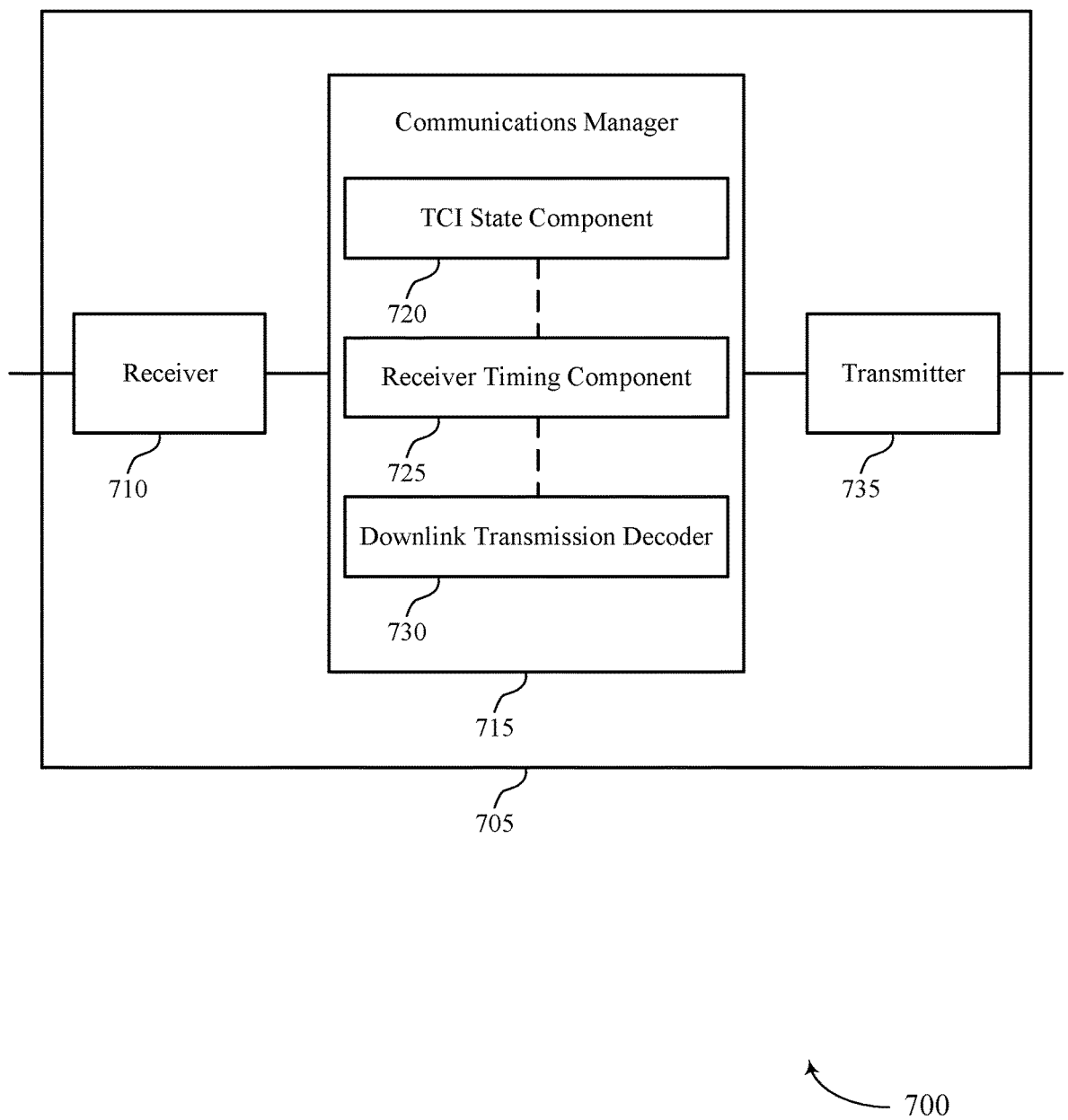

FIG. 7 shows a block diagram 700 of a device 705 that supports dynamic receiver timing for downlink transmissions in accordance with one or more aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to dynamic receiver timing for downlink transmissions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a TCI state component 720, a receiver timing component 725, and a downlink transmission decoder 730. The communications manager 715 may be an example of aspects of the communications manager 910 described herein.

The TCI state component 720 may receive signaling that identifies a transmission configuration state from a set of transmission configuration states configured for the UE.

The receiver timing component 725 may determine a receiver timing for a FFT for a downlink transmission from one or more TRPs.

The downlink transmission decoder 730 may receive the downlink transmission from the one or more TRPs and decode the downlink transmission based on the receiver timing.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
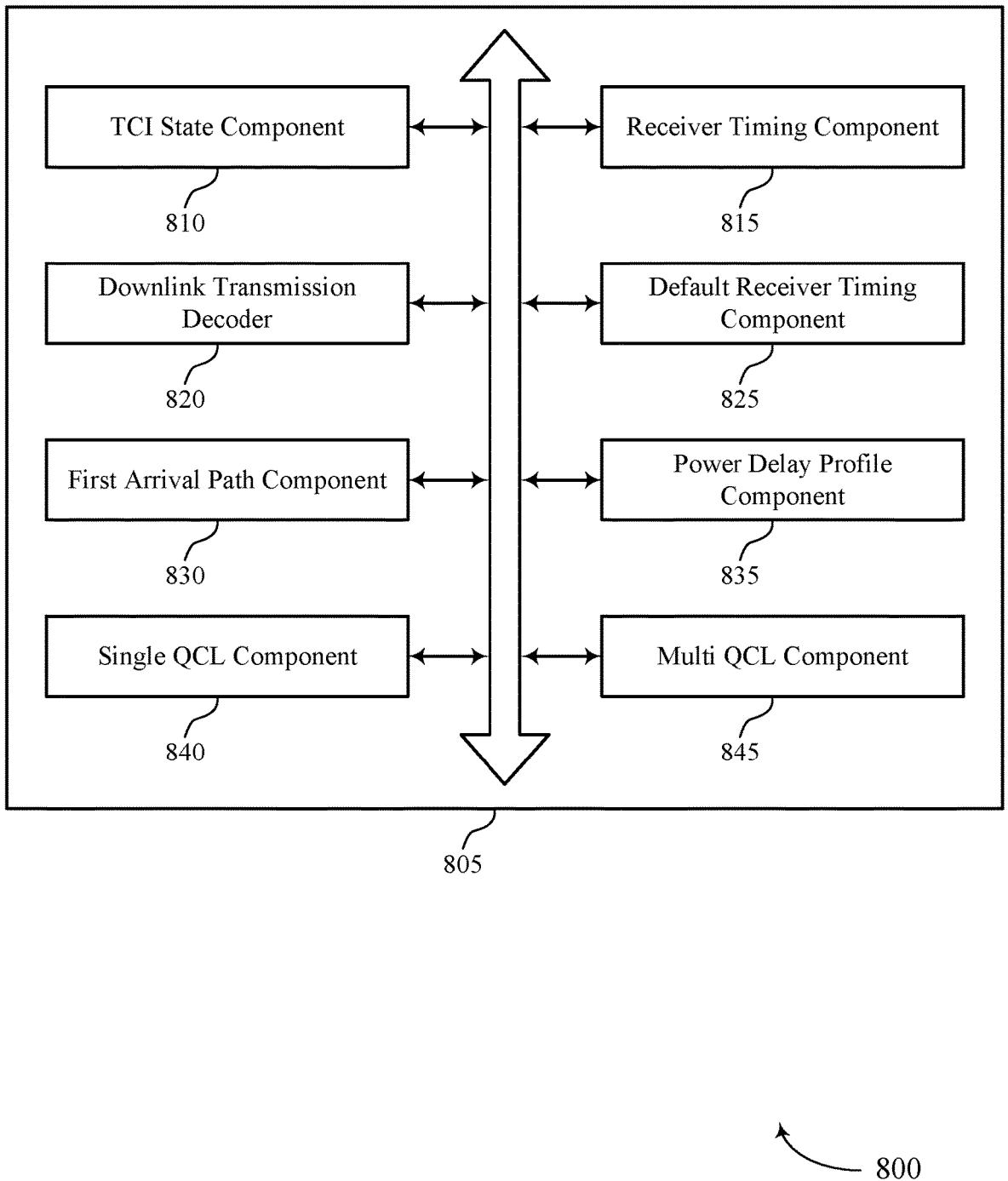
FIG. 8 shows a block diagram of a communications manager that supports dynamic receiver timing for downlink transmissions in accordance with one or more aspects of the present disclosure.

FIG. 8 shows a block diagram 800 of a communications manager 805 that supports dynamic receiver timing for downlink transmissions in accordance with one or more aspects of the present disclosure. The communications manager 805 may be an example of aspects of a communications manager 615, a communications manager 715, or a communications manager 910 described herein. The communications manager 805 may include a TCI state component 810, a receiver timing component 815, a downlink transmission decoder 820, a default receiver timing component 825, a first arrival path component 830, a power delay profile component 835, a single QCL component 840, and a multi QCL component 845. Each of these modules may communicate, directly or indirectly, with one another (e.g., via one or more buses).

The TCI state component 810 may receive signaling that identifies a transmission configuration state from a set of transmission configuration states configured for the UE. In some examples, the TCI state component 810 may receive a downlink control channel from the one or more TRPs. In some examples, the TCI state component 810 may identify the transmission configuration state based on the downlink control channel. In some examples, the TCI state component 810 may determine a MCS after decoding the received downlink control channel. In some examples, the TCI state component 810 may determine the receiver timing based on the MCS. In some cases, the receiver timing is determined based on a previous MCS, a RS to interference plus noise ratio (RS SINR), or both.

The receiver timing component 815 may determine a receiver timing for a FFT for a downlink transmission from one or more TRPs. In some examples, the receiver timing component 815 may determine respective receiver timings for a set of receiver ports based on the subset of transmission configuration states activated via a MAC-CE. In some examples, the receiver timing component 815 may determine the receiver timing based on the identified transmission configuration state. In some examples, the receiver timing component 815 may determine a second receiver timing for a second downlink transmission from the one or more TRPs. In some examples, the receiver timing component 815 may identify a second transmission configuration state for the second downlink transmission, where the second receiver timing is determined based on the second transmission configuration state. In some examples, the receiver timing component 815 may determine a priority associated with the downlink transmission and the second downlink transmission. In some examples, the receiver timing component 815 may determine the receiver timing of the second receiver timing based on the priority. In some cases, the downlink transmission includes a shared downlink transmission. In some cases, the second downlink transmission includes a semi-persistent shared downlink transmission or a channel state RS.

The downlink transmission decoder 820 may receive the downlink transmission from the one or more TRPs. In some examples, the downlink transmission decoder 820 may decode the downlink transmission based on the receiver timing.

The default receiver timing component 825 may determine a default receiver timing based on the transmission configuration state being associated with a downlink control channel for the UE. In some examples, the default receiver timing component 825 may determine a default receiver timing based on a subset of transmission configuration states activated by a MAC-CE.

The first arrival path component 830 may detect a FAP of a RS corresponding to a downlink control resource set allocated for the UE. In some examples, the first arrival path component 830 may determine the receiver timing based on the FAP. In some examples, the first arrival path component 830 may jointly detect a FAP of one or more RSs associated with the subset of transmission configuration states activated via a MAC-CE. In some examples, the first arrival path component 830 may detect respective FAPs for each RS of the one or more RSs. In some examples, the first arrival path component 830 may determine the default receiver timing based on an earliest FAP of the respective FAPs. In some cases, the RS is quasi co-located with the downlink control resource set. In some cases, the downlink control resource set is associated with a lowest control resource set identifier (ID) of a set of control resource set IDs.

The power delay profile component 835 may combine a set of PDPs estimated from the RSs associated with the subset of transmission configuration states. In some examples, the power delay profile component 835 may estimate a FAP for the combined set of PDPs, where the default receiver timing is determined based on the estimated FAP.

The single QCL component 840 may detect one or more FAPs of RSs corresponding to the set of transmission configuration states. In some examples, determining that the transmission configuration state includes a single QCL relationship. In some examples, the single QCL component 840 may select a FAP of the one or more FAPs based on the transmission configuration state. In some examples, the single QCL component 840 may determine the receiver timing based on the selected FAP.

The multi QCL component 845 may determine that the transmission configuration state includes multiple QCL relationships. In some examples, the multi QCL component 845 may receive multiple quasi co-located RSs from multiple TRPs, where the multiple quasi-co located RSs correspond to the multiple QCL relationships. In some examples, the multi QCL component 845 may determine the receiver timing based on the multiple quasi co-located RSs. In some examples, the multi QCL component 845 may determine respective FAPs for the multiple quasi co-located RSs. In some examples, the multi QCL component 845 may determine the receiver timing based on an earliest FAP of the respective FAPs. In some examples, the multi QCL component 845 may combine a set of PDPs associated with the multiple quasi co-located RSs. In some examples, the multi QCL component 845 may determine the receiver timing based on the combined set of PDPs. In some examples, the multi QCL component 845 may receive disjoint resource blocks from multiple TRPs. In some examples, the multi QCL component 845 may determine a respective receiver timing for each of the multiple TRPs based on the disjoint resource blocks. In some cases, the disjoint resource blocks are received via the same time resources.

Figure 9:
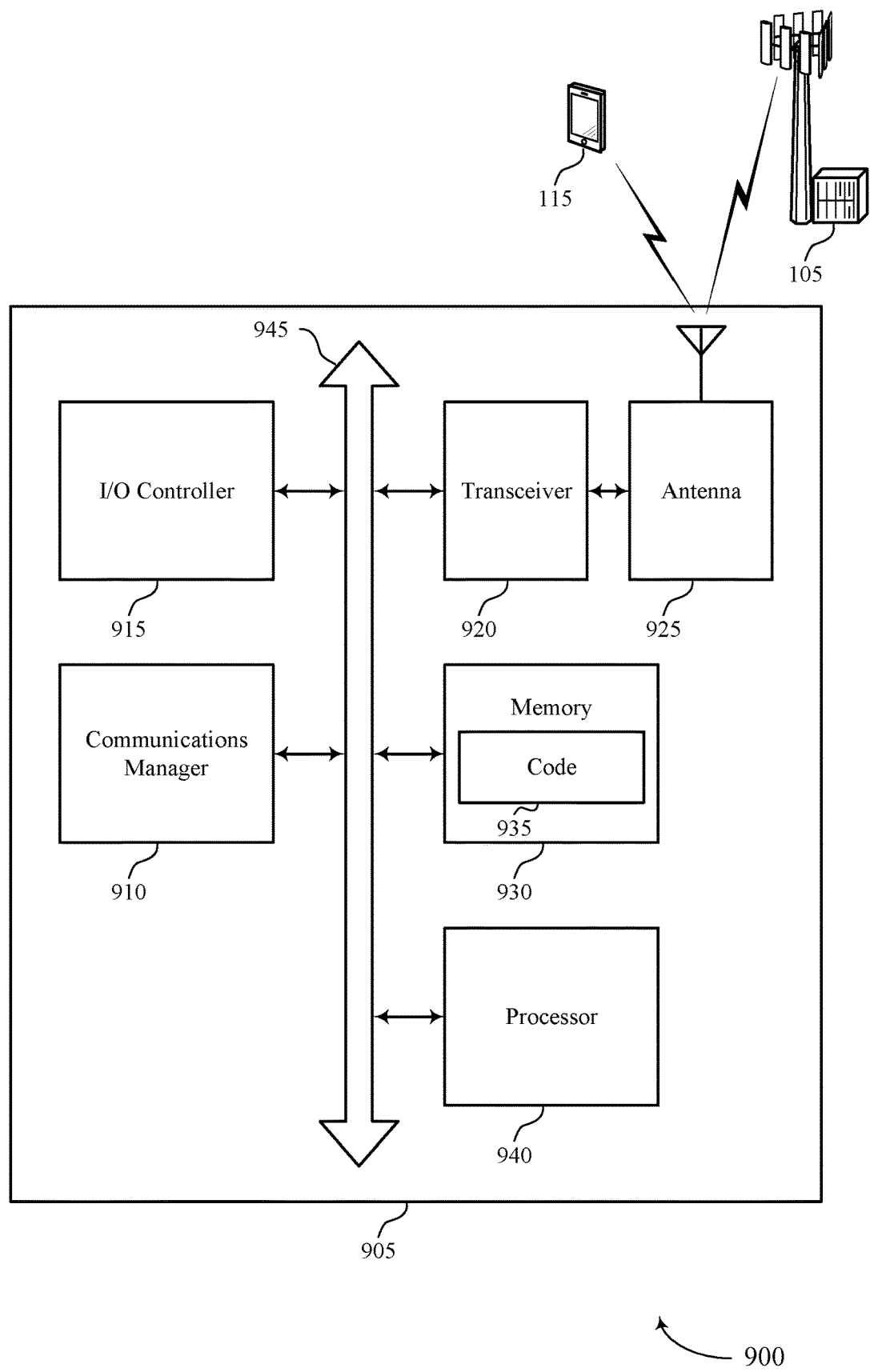
FIG. 9 shows a diagram of a system including a device that supports dynamic receiver timing for downlink transmissions in accordance with one or more aspects of the present disclosure.

FIG. 9 shows a diagram of a system 900 including a device 905 that supports dynamic receiver timing for downlink transmissions in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive signaling that identifies a transmission configuration state from a set of transmission configuration states configured for the UE, determine a receiver timing for a FFT for a downlink transmission from one or more TRPs, receive the downlink transmission from the one or more TRPs, and decode the downlink transmission based on the receiver timing.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic receiver timing for downlink transmissions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
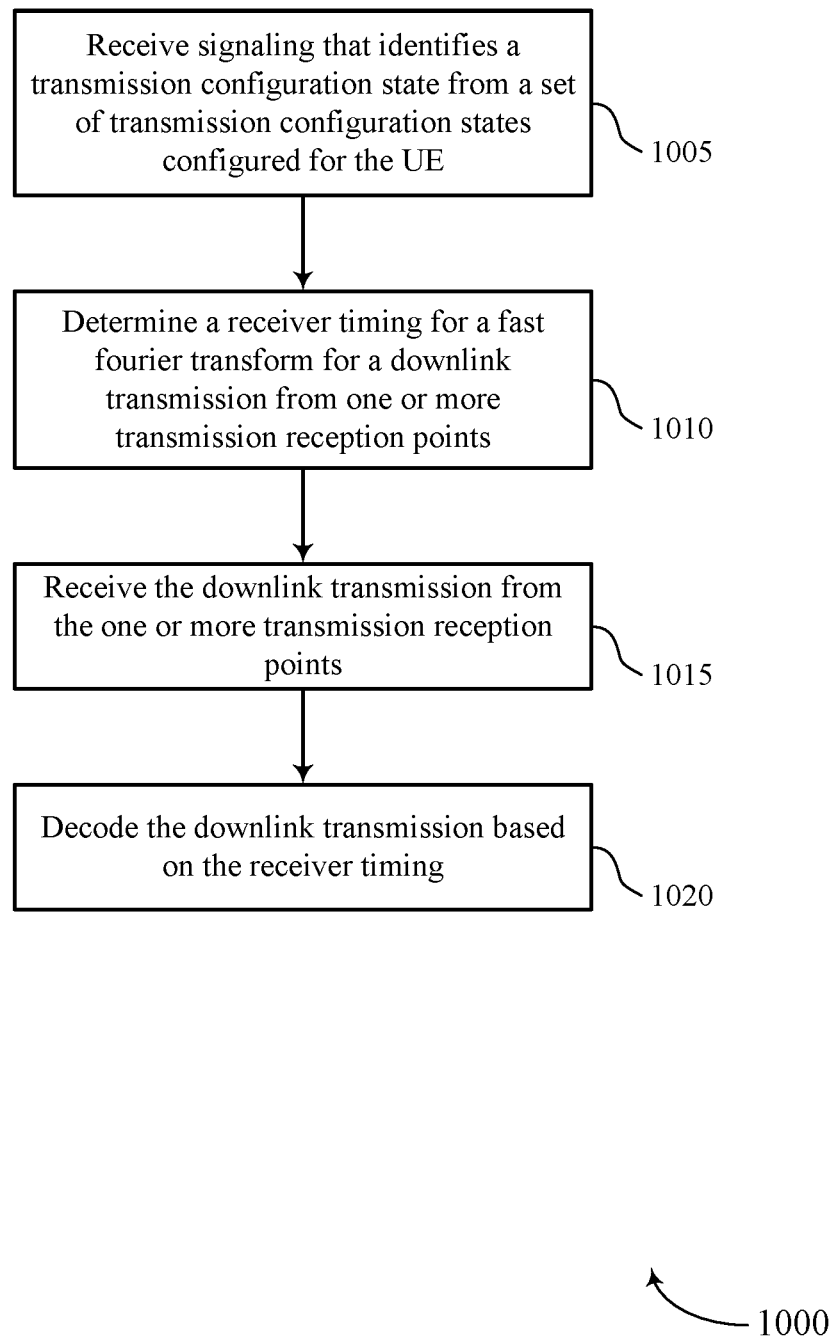
FIGS. 10 through 13 show flowcharts illustrating methods that support dynamic receiver timing for downlink transmissions in accordance with one or more aspects of the present disclosure.

FIG. 10 shows a flowchart illustrating a method 1000 that supports dynamic receiver timing for downlink transmissions in accordance with one or more aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive signaling that identifies a transmission configuration state from a set of transmission configuration states configured for the UE. The operations of 1005 may be performed according to the methods described herein. In some examples, aspects of the operations of 1005 may be performed by a TCI state component as described with reference to FIGS. 6 through 9.

At 1010, the UE may determine a receiver timing for a FFT for a downlink transmission from one or more TRPs. The operations of 1010 may be performed according to the methods described herein. In some examples, aspects of the operations of 1010 may be performed by a receiver timing component as described with reference to FIGS. 6 through 9.

At 1015, the UE may receive the downlink transmission from the one or more TRPs. The operations of 1015 may be performed according to the methods described herein. In some examples, aspects of the operations of 1015 may be performed by a downlink transmission decoder as described with reference to FIGS. 6 through 9.

At 1020, the UE may decode the downlink transmission based on the receiver timing. The operations of 1020 may be performed according to the methods described herein. In some examples, aspects of the operations of 1020 may be performed by a downlink transmission decoder as described with reference to FIGS. 6 through 9.

Figure 11:
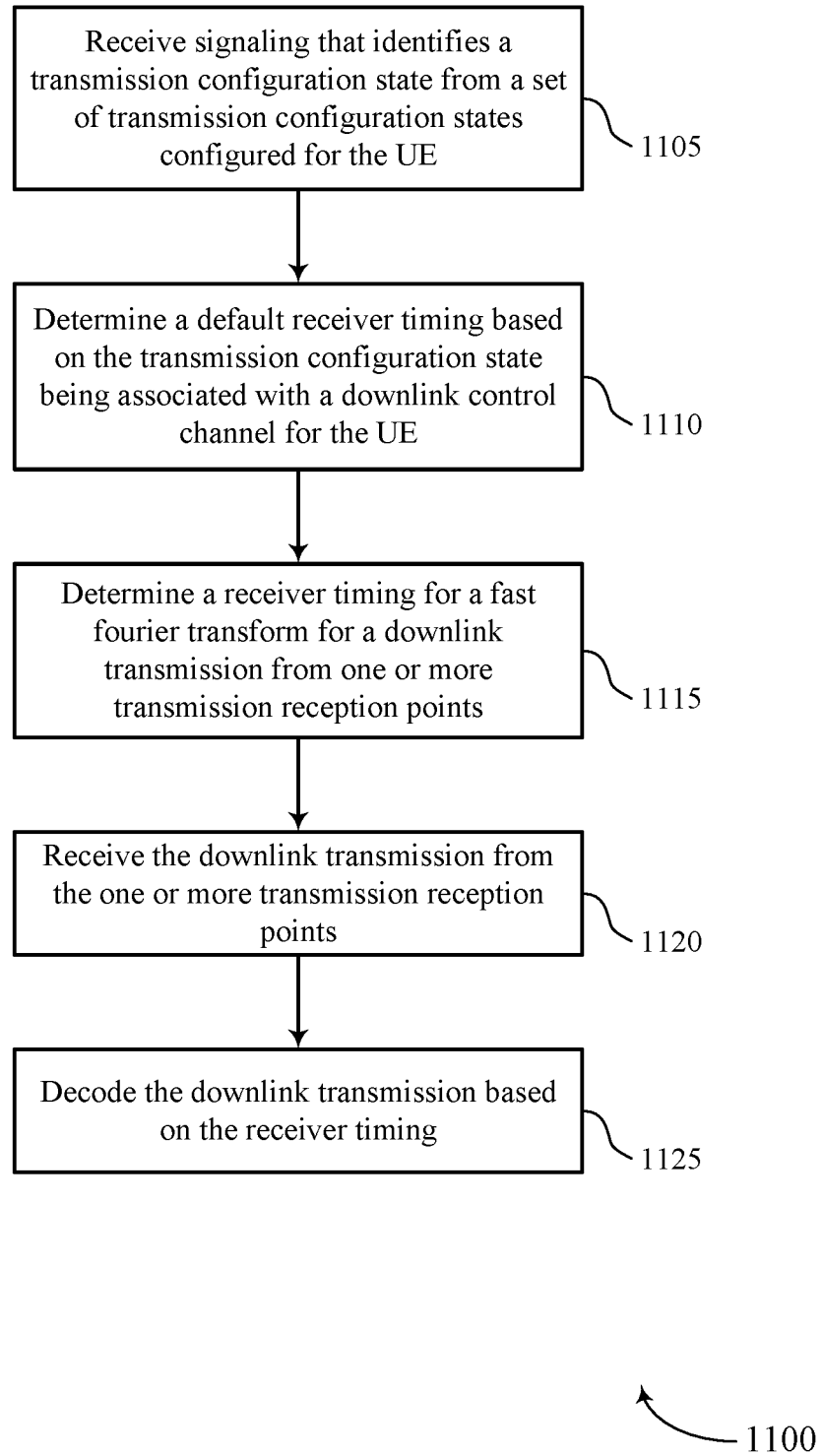

FIG. 11 shows a flowchart illustrating a method 1100 that supports dynamic receiver timing for downlink transmissions in accordance with one or more aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive signaling that identifies a transmission configuration state from a set of transmission configuration states configured for the UE. The operations of 1105 may be performed according to the methods described herein. In some examples, aspects of the operations of 1105 may be performed by a TCI state component as described with reference to FIGS. 6 through 9.

At 1110, the UE may determine a default receiver timing based on the transmission configuration state being associated with a downlink control channel for the UE. The operations of 1110 may be performed according to the methods described herein. In some examples, aspects of the operations of 1110 may be performed by a default receiver timing component as described with reference to FIGS. 6 through 9.

At 1115, the UE may determine a receiver timing for a FFT for a downlink transmission from one or more TRPs. The operations of 1115 may be performed according to the methods described herein. In some examples, aspects of the operations of 1115 may be performed by a receiver timing component as described with reference to FIGS. 6 through 9.

At 1120, the UE may receive the downlink transmission from the one or more TRPs. The operations of 1120 may be performed according to the methods described herein. In some examples, aspects of the operations of 1120 may be performed by a downlink transmission decoder as described with reference to FIGS. 6 through 9.

At 1125, the UE may decode the downlink transmission based on the receiver timing. The operations of 1125 may be performed according to the methods described herein. In some examples, aspects of the operations of 1125 may be performed by a downlink transmission decoder as described with reference to FIGS. 6 through 9.

Figure 12:
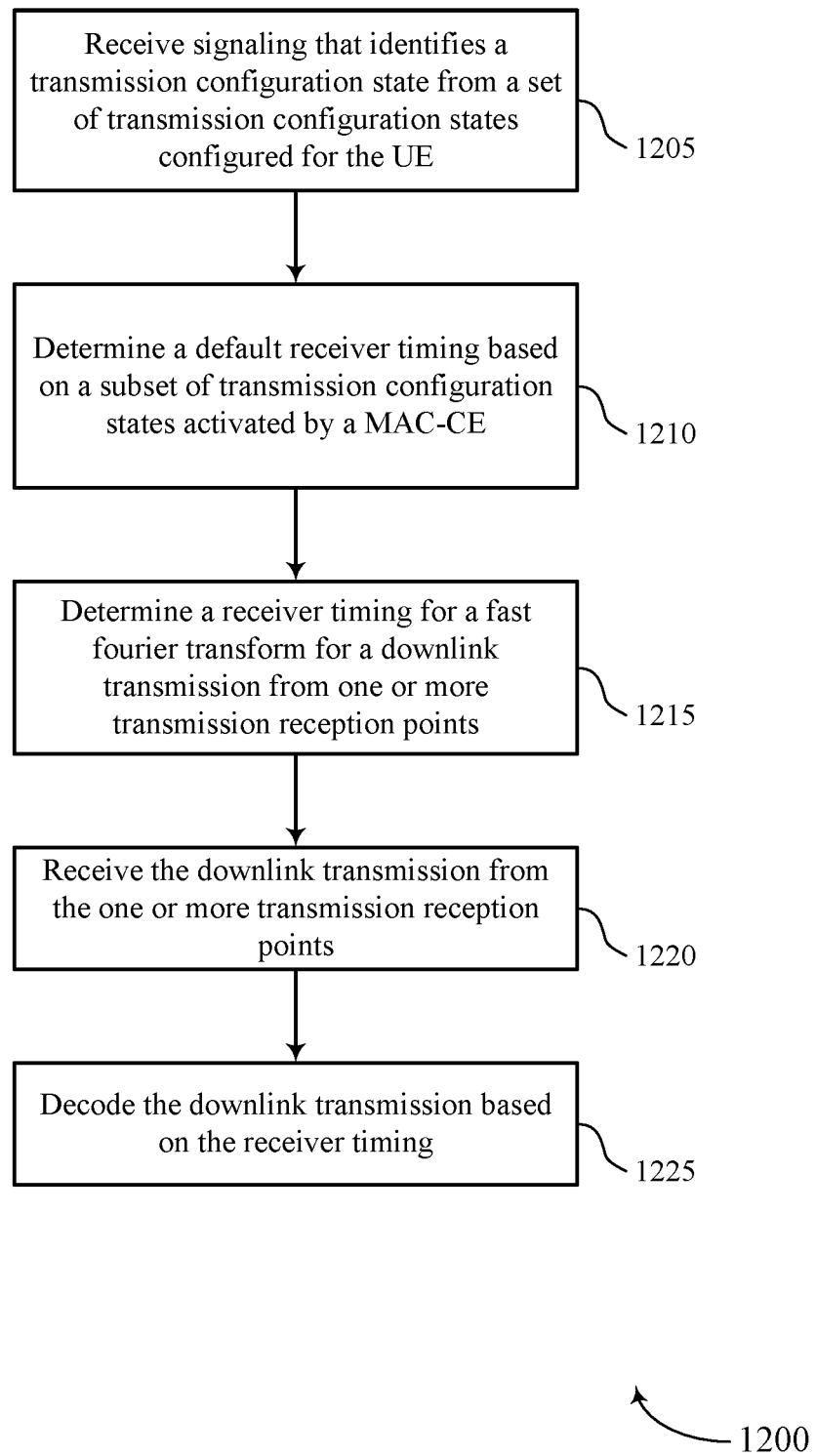

FIG. 12 shows a flowchart illustrating a method 1200 that supports dynamic receiver timing for downlink transmissions in accordance with one or more aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive signaling that identifies a transmission configuration state from a set of transmission configuration states configured for the UE. The operations of 1205 may be performed according to the methods described herein. In some examples, aspects of the operations of 1205 may be performed by a TCI state component as described with reference to FIGS. 6 through 9.

At 1210, the UE may determine a default receiver timing based on a subset of transmission configuration states activated by a MAC-CE. The operations of 1210 may be performed according to the methods described herein. In some examples, aspects of the operations of 1210 may be performed by a default receiver timing component as described with reference to FIGS. 6 through 9.

At 1215, the UE may determine a receiver timing for a FFT for a downlink transmission from one or more TRPs. The operations of 1215 may be performed according to the methods described herein. In some examples, aspects of the operations of 1215 may be performed by a receiver timing component as described with reference to FIGS. 6 through 9.

At 1220, the UE may receive the downlink transmission from the one or more TRPs. The operations of 1220 may be performed according to the methods described herein. In some examples, aspects of the operations of 1220 may be performed by a downlink transmission decoder as described with reference to FIGS. 6 through 9.

At 1225, the UE may decode the downlink transmission based on the receiver timing. The operations of 1225 may be performed according to the methods described herein. In some examples, aspects of the operations of 1225 may be performed by a downlink transmission decoder as described with reference to FIGS. 6 through 9.

Figure 13:
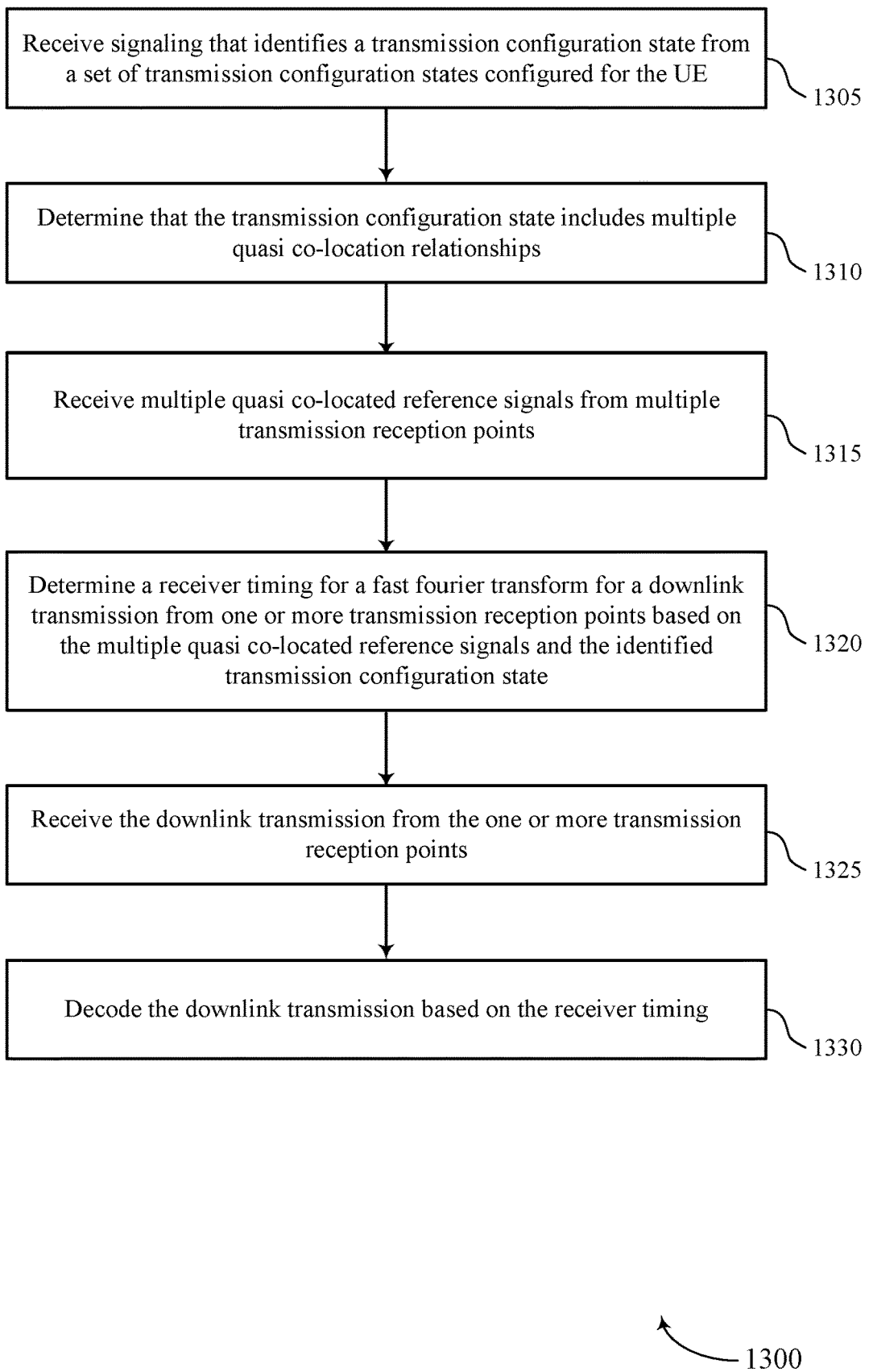

FIG. 13 shows a flowchart illustrating a method 1300 that supports dynamic receiver timing for downlink transmissions in accordance with one or more aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive signaling that identifies a transmission configuration state from a set of transmission configuration states configured for the UE. The operations of 1305 may be performed according to the methods described herein. In some examples, aspects of the operations of 1305 may be performed by a TCI state component as described with reference to FIGS. 6 through 9.

At 1310, the UE may determine that the transmission configuration state includes multiple QCL relationships. The operations of 1310 may be performed according to the methods described herein. In some examples, aspects of the operations of 1310 may be performed by a multi QCL component as described with reference to FIGS. 6 through 9.

At 1315, the UE may receive multiple quasi co-located RSs from multiple TRPs (e.g., where the multiple quasi-co located RSs correspond to the multiple QCL relationships). The operations of 1315 may be performed according to the methods described herein. In some examples, aspects of the operations of 1315 may be performed by a multi QCL component as described with reference to FIGS. 6 through 9.

At 1320, the UE may determine a receiver timing for a FFT for a downlink transmission from one or more TRPs based on the multiple quasi co-located RSs and the identified transmission configuration state. The operations of 1320 may be performed according to the methods described herein. In some examples, aspects of the operations of 1320 may be performed by a receiver timing component as described with reference to FIGS. 6 through 9.

At 1325, the UE may receive the downlink transmission from the one or more TRPs. The operations of 1335 may be performed according to the methods described herein. In some examples, aspects of the operations of 1335 may be performed by a downlink transmission decoder as described with reference to FIGS. 6 through 9.

At 1330, the UE may decode the downlink transmission based on the receiver timing. The operations of 1340 may be performed according to the methods described herein. In some examples, aspects of the operations of 1340 may be performed by a downlink transmission decoder as described with reference to FIGS. 6 through 9.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the network devices 105 may have similar frame timing, and transmissions from different network devices 105 may be approximately aligned in time. For asynchronous operation, the network devices 105 may have different frame timing, and transmissions from different network devices 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a downlink transmission from one or more transmission/reception points (TRPs);
    receiving signaling that identifies a transmission control indicator (TCI) state from a set of one or more TCI states configured for the UE, wherein each TCI state from the set comprises at least one quasi co-location (QCL) relationship;
    determining a receiver timing for a fast Fourier transform based at least in part on the TCI state; and
    performing the fast Fourier transform to decode the downlink transmission.

2. The method of claim 1, wherein the signaling that identifies the TCI state comprises radio resource control (RRC) signaling.

3. The method of claim 1, wherein the signaling that identifies the TCI state comprises downlink control information (DCI).

4. The method of claim 1, further comprising:
    detecting one or more first arrival paths of reference signals corresponding to the set of one or more TCI states;
    determining that the TCI state comprises a single QCL relationship;
    selecting a first arrival path of the one or more first arrival paths based at least in part on the TCI state; and
    determining the receiver timing based at least in part on the selected first arrival path.

5. The method of claim 1, further comprising:
    determining that the TCI state comprises multiple QCL relationships;
    receiving multiple quasi co-located reference signals from multiple TRPs, wherein the multiple quasi co-located reference signals correspond to the multiple QCL relationships; and
    determining the receiver timing based at least in part on the received multiple quasi co-located reference signals.

6. The method of claim 5, further comprising:
    determining respective first arrival paths for the received multiple quasi co-located reference signals; and
    determining the receiver timing based at least in part on an earliest first arrival path of the respective first arrival paths.

7. The method of claim 5, further comprising:
    combining a set of power delay profiles (PDPs) associated with the multiple quasi co-located reference signals; and
    determining the receiver timing based at least in part on the combined set of PDPs.

8. The method of claim 1, wherein:
    receiving disjoint resource blocks from multiple TRPs; and
    determining a respective receiver timing for each of the multiple TRPs based at least in part on the disjoint resource blocks.

9. The method of claim 8, wherein the disjoint resource blocks are received via a same time domain resource application.

10. The method of claim 1, further comprising:
    determining a first receiver timing for the fast Fourier transform for the downlink transmission from the one or more TRPs; and
    determining a second receiver timing for a second fast Fourier transform for a second downlink transmission from the one or more TRPs.

11. The method of claim 10, further comprising:
    determining a priority associated with the downlink transmission and the second downlink transmission; and
    determining the second receiver timing based at least in part on the priority.

12. The method of claim 10, wherein:
    the downlink transmission comprises a shared downlink transmission; and
    the second downlink transmission comprises a semi-persistent shared downlink transmission or a channel state reference signal.

13. The method of claim 1, further comprising:
    determining a second receiver timing for a second fast Fourier transform for a second downlink transmission from the one or more TRPs; and
    identifying a second TCI state for the second downlink transmission, wherein the second receiver timing is determined based at least in part on the second TCI state.

14. The method of claim 1, further comprising:
    detecting a first arrival path of a reference signal corresponding to a downlink control resource set of one or more downlink control resources allocated for the UE; and
    determining a receiver timing for the fast Fourier transform based at least in part on the first arrival path.

15. A method for wireless communications at a user equipment (UE), comprising:
- receiving a downlink control channel transmission from one or more transmission/reception points (TRPs);
- determining a modulation coding scheme (MCS) after decoding the received downlink control channel transmission;
- determining a receiver timing for a fast Fourier transform for a downlink transmission from the one or more TRPs based at least in part on the MCS;
- receiving the downlink transmission from the one or more TRPs; and
- decoding the downlink transmission based at least in part on the receiver timing.

16. The method of claim 15, further comprising:
- identifying a transmission control indicator (TCI) state based at least in part on the downlink control channel transmission.

17. The method of claim 15, wherein the receiver timing is determined based at least in part on a previous MCS, a reference signal to interference plus noise ratio (RS SINR), or both.

18. A method for wireless communications at a user equipment (UE), comprising:
- receiving a downlink transmission from one or more transmission/reception points (TRPs);
- determining a default receiver timing for a fast Fourier transform based at least in part on a subset of one or more transmission control indicator (TCI) states activated by a medium access control (MAC) control element (MAC-CE), wherein each of the one or more TCI states comprises at least one quasi co-location (QCL) relationship; and
- performing the fast Fourier transform to decode the downlink transmission.

19. The method of claim 18, further comprising:
- jointly detecting a first arrival path of one or more reference signals associated with the subset of one or more TCI states activated via a MAC-CE.

20. The method of claim 19, wherein:
- detecting respective first arrival paths for each reference signal of the one or more reference signals; and
- determining the default receiver timing based at least in part on an earliest first arrival path of the respective first arrival paths.

21. The method of claim 19, further comprising:
- combining a set of power delay profiles (PDPs) estimated from the one or more reference signals associated with the subset of one or more TCI states; and
- estimate a first arrival path for the combined set of PDPs, wherein the default receiver timing is determined based at least in part on the estimated first arrival path.

22. The method of claim 18, further comprising:
- determining respective receiver timings for a set of receiver ports based at least in part on the subset of one or more TCI states activated via a MAC-CE.

23. A method for wireless communications at a user equipment (UE), comprising:
- receiving a downlink transmission from one or more transmission/reception points (TRPs);
- detecting a first arrival path of a reference signal corresponding to a downlink control resource set of one or more downlink control resources allocated for the UE, wherein a downlink control resource set of one or more downlink control resources is associated with a lowest control resource set identifier (ID) of a set of control resource set IDs;
- determining a receiver timing for a fast Fourier transform based at least in part on the first arrival path; and
- performing the fast Fourier transform to decode the downlink transmission.

24. The method of claim 23, wherein the reference signal is quasi co-located with a downlink control resource set of one or more downlink control resources.

25. An apparatus for wireless communications at a user equipment (UE), comprising:
- a processor; and
- memory coupled with the processor, the processor and memory configured to:
  - receive a downlink transmission from one or more transmission/reception points (TRPs);
  - receive signaling that identifies a transmission control indicator (TCI) state from a set of one or more TCI states configured for the UE, wherein each TCI state of the set comprises at least one quasi co-location (QCL) relationship;
  - determine a receiver timing for a fast Fourier transform based at least in part on the TCI state; and
  - perform the fast Fourier transform to decode the downlink transmission.

26. The apparatus of claim 25, wherein the processor and memory are further configured to:
- detect one or more first arrival paths of reference signals corresponding to the set of one or more TCI states;
- determine that the TCI state comprises a single QCL relationship;
- select a first arrival path of the one or more first arrival paths based at least in part on the TCI state; and
- determine the receiver timing based at least in part on the selected first arrival path.

27. The apparatus of claim 25, wherein the processor and memory are further configured to:
- determine that the TCI state comprises multiple QCL relationships;
- receive multiple quasi co-located reference signals from multiple TRPs, wherein the multiple quasi co-located reference signals correspond to the multiple QCL relationships; and
- determine the receiver timing based at least in part on the received multiple quasi co-located reference signals.

* * * * *